United States Patent [19]
Marquez

[11] Patent Number: 4,888,659
[45] Date of Patent: Dec. 19, 1989

[54] TAPE CARTRIDGE FOR USE IN DISC DRIVE

[75] Inventor: Robert O. Marquez, Greeley, Colo.

[73] Assignee: Hewlett-Packard Company, Palo Alto, Calif.

[21] Appl. No.: 256,061

[22] Filed: Oct. 6, 1988

Related U.S. Application Data

[63] Continuation of Ser. No. 3,998, Jan. 16, 1987, abandoned.

[51] Int. Cl.⁴ .............................................. G11B 23/02
[52] U.S. Cl. ..................................................... 360/132
[58] Field of Search ................ 360/132, 133, 92, 96.3; 242/197–200

[56] References Cited

U.S. PATENT DOCUMENTS 4,779,156 10/1988 Ohta ..................................... 360/132
4,796,136 1/1989 Henze .................................. 360/132

FOREIGN PATENT DOCUMENTS 214820 3/1987 European Pat. Off. ............ 360/132

Primary Examiner—A. J. Heinz
Attorney, Agent, or Firm—Jeffery B. Fromm

[57] ABSTRACT

A tape cartridge adapted to utilize the read/write head(s) in a disc drive to read data from and/or write data onto the tape. The tape cartridge includes a portion which has a size and shape which enables it to be inserted into the disc drive to locate a portion of the tape at a predetermined location suitable for transferring data with the disc drive head(s). The tape cartridge includes: tape media; a means to register the tape media with respect to the read/write head(s) of a disc drive; spool or reel means for storing that portion of the tape media which is not contained within the portion which fits into the disc drive; and a means for feeding the tape media past the read/write head(s) in the disc drive. The tape cartridge includes a linkage which enables it to utilize the disc drive spindle motor to feed the tape. The tape cartridge also includes a clutching mechanism associated with each spool or reel which is adapted to drive the spool to wind tape thereon and which is further adapted to slip so as to allow the spool to rotate in the opposite direction while tape is being unwound.

45 Claims, 4 Drawing Sheets

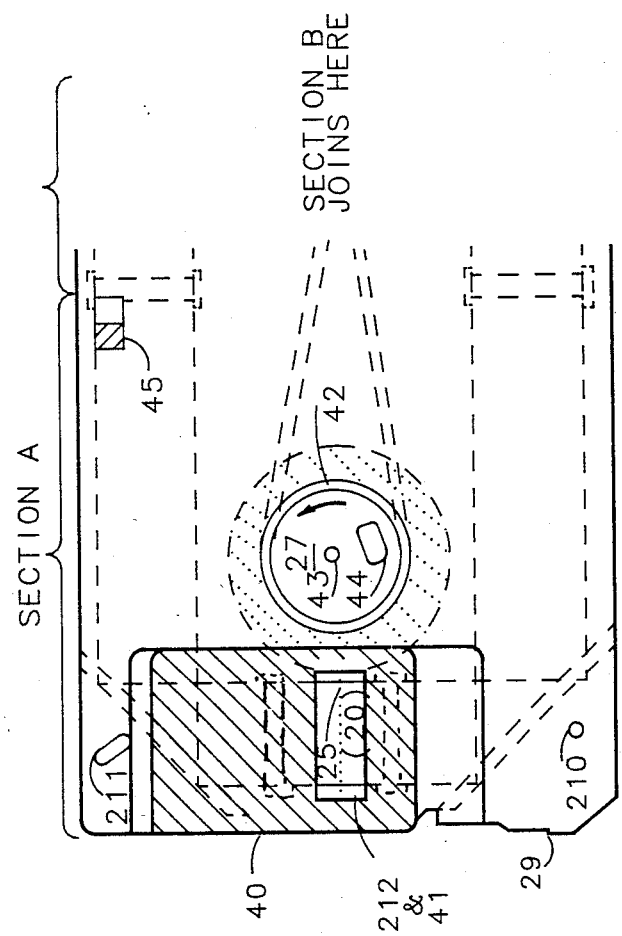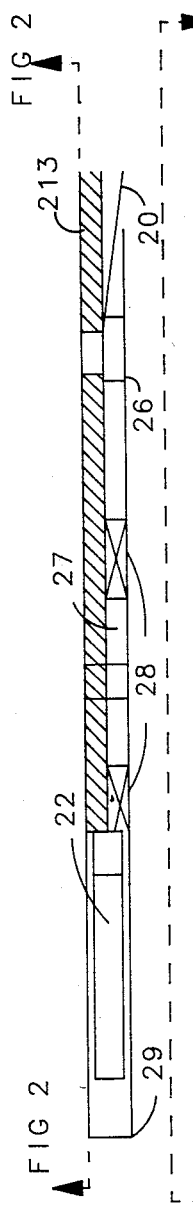

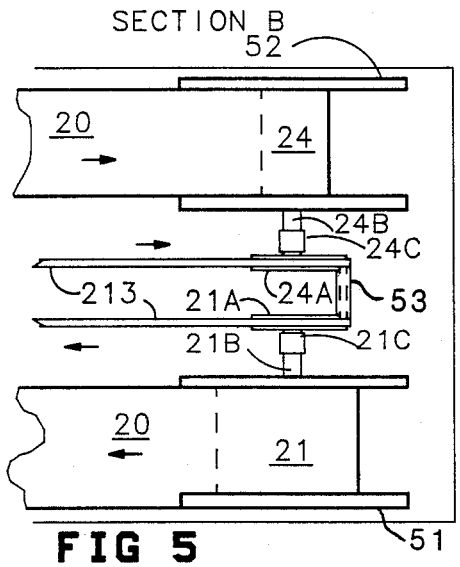
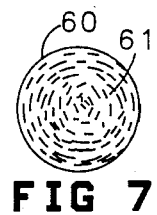
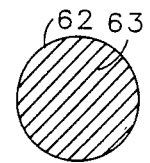
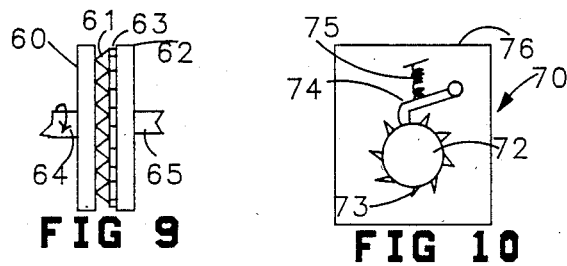
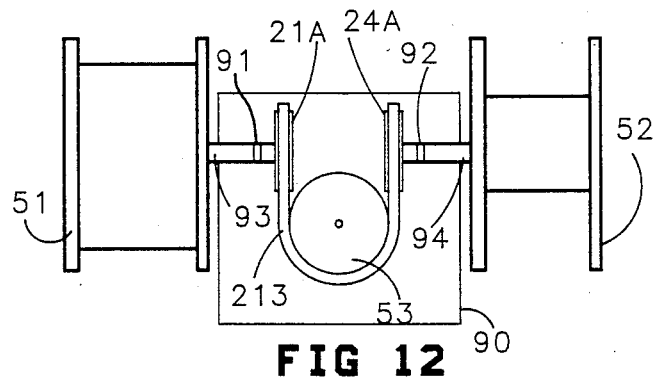

TAPE CARTRIDGE FOR USE IN DISC DRIVE

This application is a continuation of application Ser. No. 003,998, filed Jan. 16, 1987, now abandoned.

BACKGROUND OF THE INVENTION

This invention relates in general to data storage media and more particularly to a data tape cartridge that utilizes the read/write head(s) of a disc drive to read and/or write on the tape. Tape storage media are widely used to store large amounts of data that are not required to be rapidly accessed by a computer. Tape media are often used for archival storage and to store a duplicate copy of data in case the original data located in a computer is inadvertently erased o damaged. This second function is referred to a "backup" storage.

Normally, in order to store data on a tape specifically designed apparatus is required. The added expense of acquiring such a tape storage apparatus to back up on line or disc-based memory is easily justified in large data processing systems, but for small systems the additional expense can be a significant percentage of the total system cost. In the case of personal computers, the cost of the tape storage unit is on the order of the cost of the personal computer. Therefore, personal computer users generally utilize inexpensive floppy discs for both backup storage and removable data storage. Backup storage can be effected by copying the original data onto floppy discs.

Hard discs having capacities between 20 and 80 times the capacity of floppy discs are also becoming increasingly utilized by personal computer users. Because it can be quite time consuming to copy data from a hard disc onto a set of floppy discs, it is advantageous to have a tape storage unit that is inexpensive relative to the cost of personal computers for large capacity, removable data storage. Such a device can be used for backup of on line storage, distribution of software or databases, or as a low cost, slow access type of on line storage.

SUMMARY OF THE INVENTION

A tape storage unit is provided which utilizes the read/write head(s) of a disc drive to write data and/or to read data from a tape. This tape storage unit, referred to herein as the tape cartridge, contains a tape media for data storage, a mechanism to register the tape with respect to a predetermined location a which data is written onto the tape or is read from the tape by the read/write head(s) of the disc drive, a means for storing the tape media, and a mechanism to feed the tape past the read/write head(s).

The portion of the tape cartridge referred to as Section A in FIGS. 2-4 has an external shape and size which allows that portion to be inserted into the disc drive to enable the tape to be placed in the vicinity of the read/write head(s). For most disc drives, Section A has a disc-like shape.

The tape media can be any media which is compatible with the read/write scheme of the disc drive with which the tape cartridge is to be utilized. For use with present generation floppy disc drives there must be used a magnetic tape with magnetic properties suitable for operation with the disc drive's magnetic read/write head(s). These tapes can include a backing layer to increase wear resistance, to reduce friction, and/or to reduce static electric charge.

For disc drives utilizing other schemes of recording materials such as magneto-optic media or optical discs, the tape should include compatible type of recording material.

The mechanism to register the tape with respect to the read/write head(s) of the disc drive preferably comprises two components: (a) a mechanism to guide the tape and/or change the direction of the tape travel; and (b) a mechanism to align such guide mechanism with respect to some valid reference frame in the disc drive. This alignment mechanism assures that the tape is accurately positioned with respect to the read/write head(s) and is traveling along the correct path as it passes near the read/write head(s).

The tape media is stored on two spools or reels which alternately wind and rewind a length of tape. Read/write operations are either all in one direction, or in alternating directions depending upon the capabilities of the disc drive head(s). When the tape cartridge is used with a disc drive that will transfer data in either direction of tape travel, half of the tracks will be recorded in one direction and the other half will be recorded in the other direction, thereby eliminating the need to rewind the tape between data transfer on successive tracks. In disc drives that can only transfer data in one direction, the tape is rewound at the end of each track, the read/write head(s) are translated lateral to the tape feed direction to locate the head over the next track to be read or recorded, and then the data transfer process is continued.

In the tape cartridge of this invention the tape is driven by means of the disc drive spindle motor. That is, the disc drive spindle motor is utilized to move the tape past the read/write head(s) when the tape cartridge is inserted into the disc drive.

A linkage is required between the disc drive motor spindle and the spools or reels of tape. The main limitation on the linkage is its size because the size of the tape cartridge section which is inserted into the disc drive is constrained by the disc drive. The linkage should also be efficient and steady in transmitting power because of the fairly low power of typical disc drive spindle motors and because of the need to minimize perturbations in tape velocity and edge location as the tape moves past the read/write head(s).

Each spool or reel is operably connected to and associated with a clutching mechanism which enables the first reel to wind up tape while the second reel is unwound. When the linkage is driven in the opposite direction, the tape is wound onto the second reel while the first reel is unwound. Each clutching mechanism is adapted t drive the reel with which it is associated in one direction (i.e., in the direction required to wind tape onto such reel). When the tape is pulled off from the reel (i.e., the reel is being unwound), the clutch is adapted to slip so that it does not drive the reel at all.

For cartridges requiring reversal of tape direction, commands to reverse direction can be transmitted to the tape cartridge via the disc drive spindle.

Tape and disc drive devices typically have some feedback loops to adjust for variation in the speed of the media. Such feedback can adjust the speed of the media or can adjust the rate of reading and writing—the feedback need only maintain the ratio between media speed and read/write rate at a substantially constant value. For example, in many disc drives, the disc drive controller adjusts the read rate in response to transitions on the disc. This disc drive controller will identically adjust the read rate in response to data transitions on the tape in the tape cartridge. Therefore, it is only necessary to ensure that the variations in the speed of the tape past the read/write head(s) are within the response limits of the disc drive controller's read/write rate feedback loop. To help assure this, parameters of the tape media, tape guidance system, and tape feeding system, can be selected to closely emulate the parameters of the associated disc.

The nature of the data stored on the tape is determined by the means with which the disc drive head(s) store data on a disc. If the read/write head(s) store data in a bit serial fashion, then data is stored on the tape in this way. Similar compatibility between the means of data storage on a disc, and on the tape in the tape cartridge would exist whether this means was data storage in a parallel fashion, with signal amplitude modulation, or with signal frequency modulation. Any data encoding schemes that the disc drive system uses in storing data on a disc (for example, MFM data encoding which is sometimes used to encode digital data onto magnetic discs) would be identically implemented with data stored on the tape in the tape cartridge.

Data formats, which describe how the data is organized on a disc or on the tape cartridge, include such parameters as number of data tracks, number of sectors per track, number of bytes per sector, sector header information, and extra coding for error detection. These parameters are set up by the disc drive's controller. A format for the tape, and other parameters which the disc drive controller uses, such as interleave factors, would not necessarily be identical to that of disc. The primary difference is that the tape cartridge would need many more sectors per track and/or longer sectors to take advantage of the increased capacity of the tape media. Therefore, a means for temporarily changing these parameters in the disc drive controller when performing data storage with the tape cartridge is necessary for utilization of the increased capacity of the tape cartridge. These changes would be implemented either through software control via the host computer's operating system, or by changing a controller ROM which contains these parameters. The optimum means of doing this, and the specific parameters chosen, depends on the specific controller, operating system, and disc drive present.

BRIEF DESCRIPTION OF THE DRAWINGS

FIG. 3 is a side cross-sectional view of the embodiment shown in FIG. 2.

FIG. 4 is a bottom view of the embodiment shown in FIG. 2.

FIG. 5 is a top view with cover removed of one embodiment of the portion of the tape cartridge (denoted as Section B) for feeding and storing the tape media in the tape cartridge. This embodiment utilizes a length of tape with two ends, the tape being stored on two spools or reels.

FIG. 7 is an elevational view showing one section of a clutching mechanism useful in the present invention.

FIG. 8 is an elevational view showing the other section of a clutching mechanism which is adapted to cooperate with the clutch section illustrated in FIG. 7.

FIG. 9 is an edge view of the clutching mechanism formed by the sections illustrated in FIGS. 7 and 8.

FIG. 10 illustrates another type of clutching mechanism which is useful in the present invention.

FIG. 11 illustrates yet another type of clutching mechanism which is useful in the present invention.

FIG. 12 is an end cut-away view illustrating another embodiment of data tape cartridge of this invention.

DETAILED DESCRIPTION OF THE INVENTION

Figure 2:
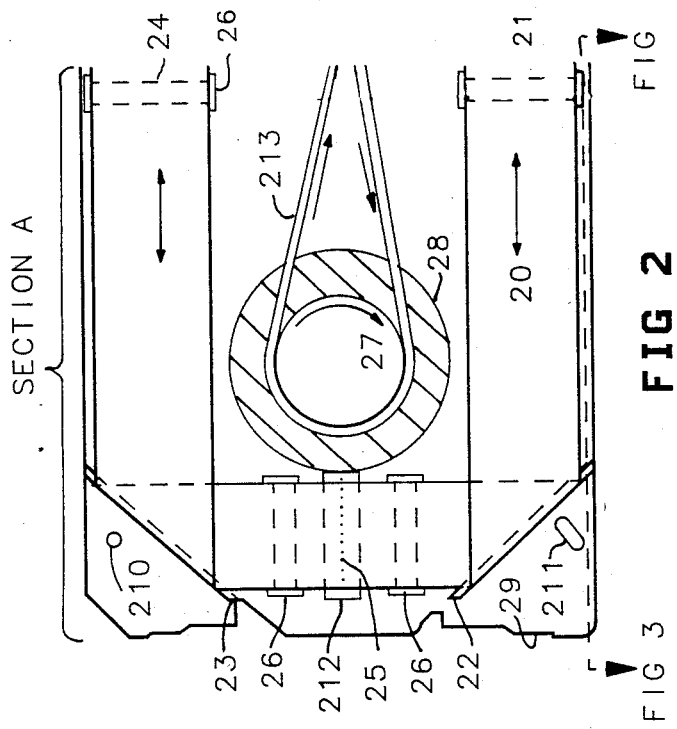
FIG. 2 is a top view with cover removed of the portion of the type cartridge (denoted as Section A) which fits inside a 3.5 inch microfloppy disc drive and which contains a mean for registering the tape with respect to the disc drive heads.

Different embodiments of data tape cartridges are shown in the drawings. The data tape cartridges of this invention may be constructed for any size disc drive, e.g., 3.5 inch microfloppy disc drive, 5 inch drive, 8 inch drive, etc.

Each embodiment of the invention includes length of tape having two ends. The tape is stored on two spools or reels within the cartridge. As tape is unwound from one spool or reel, the tape is also being wound onto the other spool. This will be readily apparent from the following detailed description and the accompanying drawings.

The size of the spools or reels which can be used in the data tape cartridges of this invention may vary. For example, the diameter of each spool may vary from about 0.5 to 3 inches, as desired. The width of each spool will also vary to match the width of the tape which is used (e.g, 0.75 inch, 1 inch, etc.).

Normally the width of the tape to be used will be less than one inch. The length of the tape to be used in the cartridges of this invention may also vary, as desired.

The section of the tape cartridge which registers the tape with respect to the disc drive heads, and is inserted into the disc drive to gain access to the heads, is shown in FIGS. 2-4 and is referred to as Section A. The section of the tape cartridge used to store and feed the tape is referred to as the feed/storage section. The feed/storage section in a tape cartridge embodiment utilizing a reversing length of tape is shown in FIG. 5 and is referred to as Section B. Hence, the tape cartridge embodiment is comprised of Sections A and B.

In the following discussion, the same reference number will be utilized for the same element shown in more than one figure. It will be useful here to introduce some definitions for use in subsequent discussion. The "disc drive head" is the mechanism for reading and/or writing data on an associated data recording medium. The tape typically has a "length," "width," and "thickness" such that its length (typically several feet) is much greater than its width (on the other of ¾ inch), and its width is much greater than its thickness (on the order of 0.0005 inch). Therefore, the tape can be viewed as a two dimensional surface extending in shall mean to translate it in the direction of its length. At a given point in the tape, the "plane of the tape" shall mean that plane that is tangent to this two dimensional surface at that point. A "tape guide" shall be any element which modifies the "plane of the tape" or the position of the edge of the tape as the tape feeds over the guide. If a tape guide modifies the plane of the tape such that the tape path is twisted around the tape guide, the tape guide shall be referred to as a "twist tape guide."

The tape media used is nominally 0.75 inches wide. This allows one of the disc drive heads to access 80 tracks, the maximum number used by standard 3.5 inch disc drives. The tape has a magnetic coating with a coercivity and thickness capable of supporting magnetic transitions written by the disc drive head at its normal data rate, at the speed which the tape is traveling. A back coating may be used if it provides benefits (e.g., reduced friction, increase wear resistance and/or reduce static electric charge) to the means for tape feed, storage or registration. If the tape is stored wrapped upon itself, this back coating must be non-magnetic to avoid print over. As 3.5 inch disc drives implement future increases in linear density due to changes in their head/media systems, the tape media may be changed in a similar manner to the disc media. This will allow the tape media to support identical increases in linear density, which will result in increased capacity and/or performance of the tape cartridge.

Figure 1:
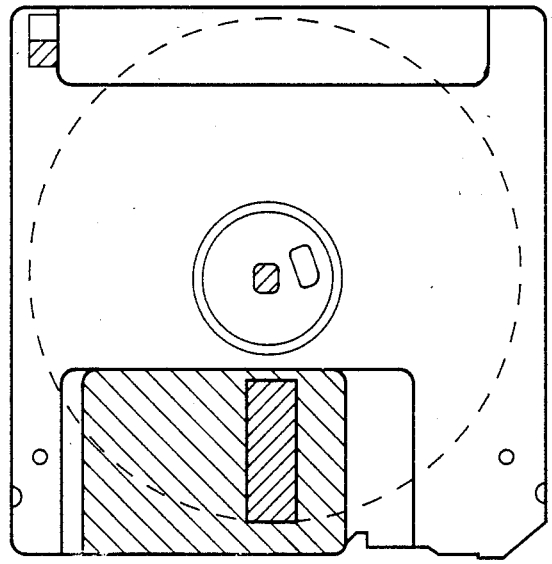
FIG. 1 is a standard 3.5 inch microfloppy disc cassette. This is the current media used to store data in a 3.5 inch microfloppy disc drive.

FIG. 1 is a bottom view of a standard 3.5 inch microfloppy disc cassette. The dashed circle represents the disc media inside the cassette. The hatched area is an autoshutter. This is a protective cover that slides when the disc cassette is inserted into the disc drive, so an opening in the autoshutter is aligned with a matching opening in the cassette, allowing the disc drive heads to access the disc media. The shutter is shown in the open position. The half filled rectangle in the top right corner of the cassette in FIG. 1 is a write protect switch. This switch position is read by a sensor in the disc drive, and allows the disc drive to recognize a write protected disc cassette.

FIG. 2-4 show Section A of the tape cartridge cause Section A is intended to fit inside a 3.5 inch microfloppy disc drive, its dimensions must be suitably close to those of a 3.5 inch microfloppy disc cassette (90 mm wide, 94 mm long, and 3.3 mm thick), so that it fits properly with the cassette loading mechanism of the disc drive. In general, this requires that Section A have a disc like shape suitable for fitting through the slot in the front of typical disc drives. The tape media 20 enters Section A from the tape supply location 21. Tape is fed from location 21 to twist tape guide 22, past a predetermined location L at which data is written onto or read from the tape by the disc drive head(s) (somewhere along dotted line 25), to twist tape guide 23, and then out of Section A to the tape taken-up location 24. In general, location L is the location at which reading and writing occur and in some disc drives, such as optical disc drives, may not be adjacent to the read/write head(s).

Because a finite length of tape is used (having two ends), the tape is fed from supply location 21 to take-up location 24. The supply and take-up then switch positions. This reverses the direction of the tape feed to rewind the tape. Once the tape is rewound, the supply and take-up revert to their original positions and the cycle is repeated. The means of this switching will be outlined in the discussion of Section B.

Twist tape guides 22 and 23 are oriented at nominally 45 degrees to the direction of feed of the tape. At each twist tape guide, the tape wraps substantially 180 degrees around the guide in a helical fashion, which changes the path of feed of the feed of the tape by 90 degrees and rotates the normal to the plane of the tape by 180 degrees. This manner of guiding the tape within Section A keeps the tape within a disc like region that has a size and shape that enable Section A to fit through the slot in the front of many typical disc drives. These guides enable the tape to enter Section A, gain proper access to location L, and exit Section A while remaining within the volume defined by Section A. In this manner, the tape passes across the disc drive heads, which are located along line 25, with a motion similar to that of the disc media.

Several other tape guides 26 provide a reference edge which acts to register the tape, and/or provide a wrap angle to change the plane of the tape. These tape guides 26 are in several locations: between tape supply location 21 and twist tape guide 22; between twist tape guides 22 and 23; and between twist tape guide 23 and tape take-up location 24. In instances where tape guide 26 provides a reference edge to register the tape, a force is exerted in the tape to constrain one of its edges to the reference edge of the tape guide 26. This force may be exerted on the tape either by deliberate misalignment of twist tape guides 22 and 23, by the shape of twist tape guides 22, 23 and/or tape guide 26, and/or by a spring loaded surface acting on the non-reference edge of the tape. All of the tape guides and drive elements which contact the tape ar fabricated from a non-magnetic material such as non-magnetic stainless steel or a ceramic material.

In the data tape cartridges of this invention, the power to feed the tape is derived from the disc drive spindle motor. As is illustrated in FIG. 4, near the center of Section A is a cylindrical hub 27 containing a circular hole 43 at the center of the hub and a second hole 44 away from the center of the hub. When the tape cartridge is loaded into a 3.5 inch disc drive, hole 43 is located onto the circular shaft of the disc drive spindle motor. As the disc drive spindle motor rotates, a spring loaded pin from the motor hub assembly extends into hole 44. By this means, power from the disc drive spindle motor is transmitted to hub 27 in the tape cartridge. The tape cartridge is enclosed by a protective shell 29. A hole 42 in the lower surface of the protective shell 29 allows the spindle motor hub assembly to access hub 27. Openings 212 in both the upper and lower surfaces of shell 29 provide access to the tape along line 25 by the disc drive heads. These openings 212 are protected by a sliding piece 40 which contains opening 41 in its upper and lower surfaces. During use of the tape cartridge, sliding piece 40 is located such that openings 41 are positioned adjacent to openings 212. This sliding piece is essentially identical in appearance and function to the "auto shutter" on a 3.5 inch microfloppy disc cassette and movement of sliding piece 40 is effected in the same manner as for the auto shutter. A write protect switch 45 operates in a similar manner to the write protect switch of a disc cassette, and interacts identically with the sensor in the disc drive that determines the state of this switch. The protective shell also includes rotary bearing 28 whose inner race rotates with hub 27 and whose outer race remains fixed, thereby isolating the rotary motion of hub 27 from the stationary part of the tape cartridge.

To ensure that the tape is accurately registered with the read/write heads, it is important that the tape cartridge be reproducibly aligned with some reference frame in the disc drive. In general, registration of the tape requires that the tape be fed past predetermined location L with an accurate positioning of the tape and a proper direction of feed of the tape. This is achieved by including within the tape cartridge a set of guide pins to accurately guide the tape within the tape cartridge and including some structure for accurately aligning the tape cartridge with the disc drive (and in particular, with location L). In the bottom of the protective shell of the microfloppy disc cassettes used in 3.5 inch microfloppy disc drives, there is a pair of holes that extend part way through the shell. When the microfloppy disc cassette is loaded into the disc drive, these holes fit over a pair of pins to partially control the vertical location of the disc cassette in the disc drive. These pins ar suitable as both vertical and translational reference points in the disc drive for the purpose of aligning the tape cartridge. Therefore, the tape cartridge includes a pair of holes 210 and 211 in the bottom surface of the protective shell 29 that are positioned to fit over the pair of pins in the disc drive unit.

The slot shaped hole 211 provides a tight clearance fit over the associated pin in the disc drive. Holes 211 and 43 provide the angular and vertical reference for the tape cartridge. Hole 210 provides a loose clearance fit over the associated pin in the disc drive and provides only vertical reference for the tape cartridge. The remainder of the translational location is determined by the tight clearance fit of hole 43 to the disc drive spindle motor's circular shaft. Two additional pins located inside the disc drive near the disc drive's cassette opening also provide vertical support to either a microfloppy disc cassette or the tape cartridge.

Because the tape cartridge is reproducibly aligned to the disc drive via holes 43, 210 and 211, tape guides 22, 23 and 26 must be accurately positioned with respect to these registration holes. The runout of bearing 28 must also be accounted for in tolerance accumulation to ensure that tape 20 is accurately aligned with the disc drive heads.

In both embodiments shown, the disc drive spindle motor is used as a power source to feed the tape. Hub 27 contains a pulley which drives belt 213. Belt 213 is used to transmit power from hub 27 to the tape driving element in Section B.

A feed/storage section, denoted as Section B, utilizing a pair of supply/takeup spools or reels 51 and 52 is shown in FIG. 5. One end of the tape media 20 is fixed onto spool 51, and the other is fixed onto spool 52. The tape media is alternately wound from one spool, that serves as a supply spool, through Section A, and onto the other spool, which serves as a take-up spool. In FIG. 5, the tape supply location 21 is on spool 51, while spool 52 is being driven to act as the tape take-up location 24. This is the direction of tape travel in which data is written or read. If the disc drive head is capable of data transfer only when the media is traveling in one direction, then the other direction of tape travel is for rewind. If the disc head design allows for bi-directional data transfer, then both directions of tape travel will accommodate data transfer.

As illustrated in FIG. 5, the flexible belt 213 driven by the disc drive spindle motor extends over pulley 21A, under and around idler pulley 53, and over pulley 24A. Pulley 21A is operably connected to tape spool or reel 51 by means of shaft 21B and clutching member 21C. Pulley 24A is operably connected to tape spool 52 by means of shaft 24B and clutching member 24C, as illustrated in FIG. 5.

Thus, as belt 213 is driven in the direction indicated by the arrows, pulley 24A is rotated in a manner such that rotational energy is transmitted to spool 52 through clutch member 24C and shaft 24B. In this manner spool 52 is rotated such that tape 20 is wound onto spool 52. Simultaneously, tape is pulled from spool 51 at the same rate. Although pulley 21A is rotated in the opposite direction of pulley 24A, clutch member 21C is adapted to slip in this direction so that no rotational energy is imparted to spool 51 through clutch 21C and shaft 21B.

When belt 213 is driven in the opposite direction, pulley 21A is rotated in the opposite direction and rotational energy is transmitted to spool 51 through clutch 21C and shaft 21B. As a result, the tape 20 is wound upon spool 51 while tape is being pulled off spool 52. When that happens, clutch 24C slips.

Each clutch mechanism 21C and 24C is adapted to transmit rotational energy therethrough only when the associated shaft is driven in one direction. When the associated shaft is driven in the opposite direction, the clutch mechanism is adapted to slip.

The drive belt and pulley arrangement of the present invention for driving the spool alternately in one direction and then the other to move the tape past the read/write head of the disc drive has many advantages over the use of conventional gear systems. For example, gear systems are very noisy, and the gears must be manufactured with great precision. Also, when changing from driving one spool to driving the other spool there may be some resulting slack in the tape, which is very undesirable and could result in the tape being crimped or bound within the cartridge.

Clutch mechanisms having the functional characteristics described above are known in the art, for example. FIGS. 7, 8 and 9 illustrate one useful embodiment of a clutch mechanism which may be used in the tape cartridge of this invention.

FIG. 7 is an elevational view of one-half 60 of the clutch mechanism in which one face has secured to it a fibrous pad member 61. The fibers on the surface of the pad project primarily in the same angular direction.

FIG. 8 is an elevational view of the other half 62 of the clutch mechanism in which one face has secured to it a screen or mesh pad 63.

FIG. 9 is an edge elevational view of the two clutch sections 60 and 62 in operational position, i.e., pad 61 and pad 63 are in face-to-face contact with each other. Also shown in FIG. 9 is shaft 64 secured to clutch section 60 and shaft 65 secured to clutch section 62.

When shaft 64 is rotated in the direction indicated by the arrow, the fibers in pad 61 engage the mesh of pad 63 and cause clutch section 62 to rotate in unison with clutch section 60. However, when shaft 64 is rotated in the opposite direction, the fibers of pad 61 slip past mesh 63 and do not engage mesh 63.

Thus, the clutch mechanism illustrated in FIGS. 7, 8 and 9 is useful as a slip clutch in the present invention. Clutches of this type are commercially available, for example, from 3M Company under the tradename "Fibre-Tran".

Another type of slip clutch mechanism 70 useful in the present invention is illustrated in FIG. 10. In this embodiment there is a rotatable shaft 72 having ratchet teeth 73 on its surface. Pawl member 74 is pivotably mounted at one end and is biased toward shaft 72 by spring member 75.

When shaft 72 is rotated in one direction the pawl 74 rides over and past teeth 73 and does not engage the shaft. When the shaft is rotated in the opposite direction the pawl member engages one of the teeth on the shaft and causes casing or housing 76 to rotate in unison with the shaft 72. A shaft secured to the opposite side of the housing can be made to rotate in this manner.

Another embodiment of slip clutch mechanism is illustrated in FIG. 11. In this embodiment rotatable shaft 80 includes a detent or notch 82 on its surface. Spring member 83 encircles the shaft loosely. One end of the spring includes a finger 84 which is biased toward the surface of the shaft.

When the shaft is rotated in one direction the finger 84 of spring 83 will not become engaged with the notch or detent 82 in the shaft. However, when the shaft is rotated in the opposite direction (i.e., in the direction indicated by the arrow), finger 84 of spring 83 engages notch or detent 82 in shaft 80. Upon further rotation of shaft 80, the spring member 83 is caused to wrap around shaft 80 more tightly so that the spring grips the shaft. The other end of the spring is operably connected to another shaft which is accordingly caused to rotate when spring 83 engages shaft 80.

Other conventional types of slip clutches may also be used in the tape cartridges of this invention, so long as they function in the manner described herein. For example, another type of useful one-way or slip clutch which may be used is a conventional spring clutch comprising a coiled spring which is wrapped around a shaft with very close tolerance between the spring and the shaft. When the shaft is rotated in one direction the spring slips relative to the shaft (i.e., the spring does not engage the shaft). When the shaft rotates in the opposite direction the spring grips the shaft and becomes tighter. Connected to one end of the spring is a housing which may be connected to another shaft, or a pulley, or a tape reel, for example. Thus, when the spring grips the rotating shaft, the spring transmits the rotational motion to another shaft, or a pulley, or the tape reel.

Figure 6:
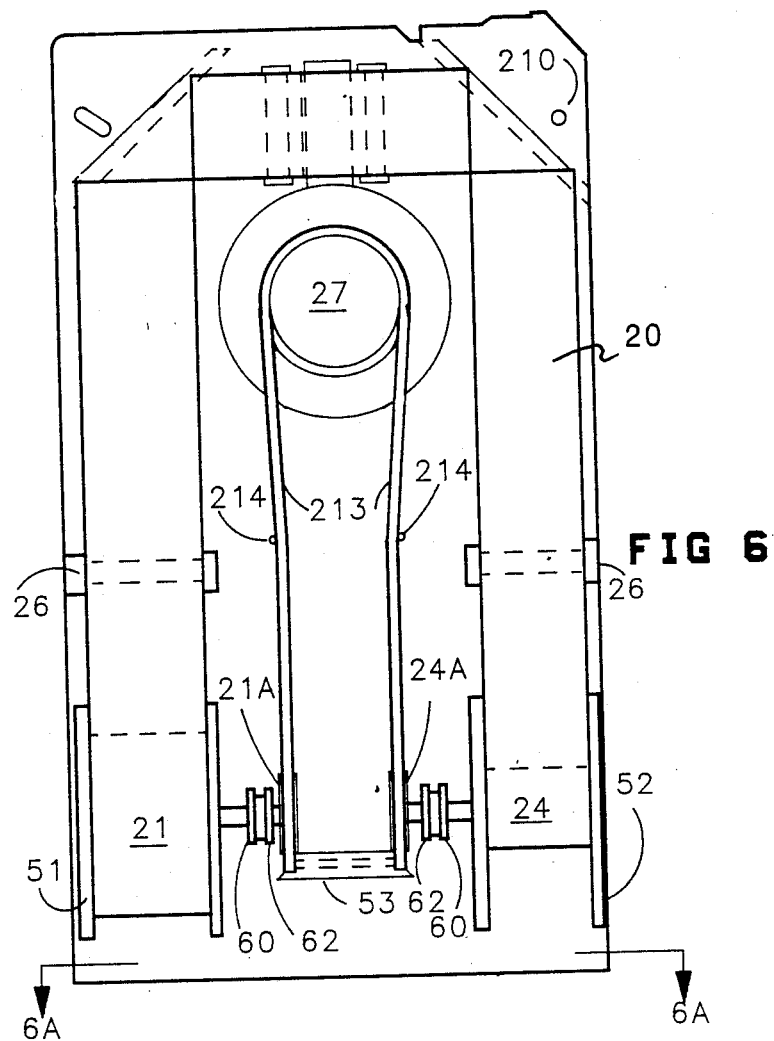
FIG. 6 is a top view with cover removed of one embodiment of tape cartridge of the invention.
Figure 6A:
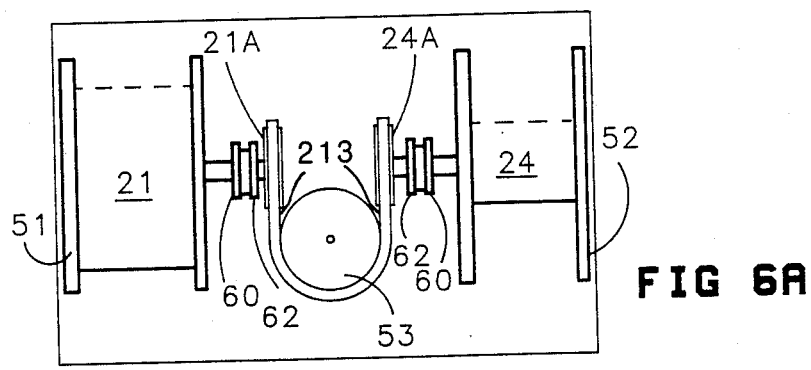
FIG. 6A is a sectional view of a tape cartridge taken along line 6A—6A in FIG. 6.

Another embodiment of tape cartridge of the invention is illustrated in FIGS. 6 and 6A. In this embodiment the flexible endless belt extends around hub 27 (which is driven by the disc drive spindle motor), over pulley 24A, under idler pulley 53, and then over pulley 21A. To minimize oscillations and wobble in belt 213, idler 214 are positioned between hub 27 and pulleys 21A and 24A. The belt rides against these idler as it moves.

The clutch mechanisms shown in the embodiment of FIGS. 6 and 6A are that illustrated in FIGS. 7, 8 and 9. Thus, each clutch mechanism comprises clutch pad 60 and clutch pad 62. When pulley 21A is rotated in one direction the clutch pad 62 engages pad 60 and drives spool 51 in a rotational manner so as to wind the tape onto spool 51. When pulley 21A is rotated in the opposite direction pad 62 can slip past pad 60 and does not drive spool 51.

Similarly, when pulley 24A is rotated in one direction the associated clutch pad 62 engages clutch pad 60 and drives spool 52 in a rotational manner so as to wind the tape onto spool 52. When pulley 24A is rotated in the opposite direction clutch pad 62 slips past pad 60.

The clutch mechanisms used in the tape cartridges of this invention operate such that when one spool of tape is driven in a rotational manner so as to wind tape thereon, the tape is simultaneously unwound from the other spool.

FIG. 12 is an end view which illustrates another embodiment of tape cartridge of this invention. In this embodiment a housing 90 (shown in cut-away) encloses the pulleys 21A and 24A, idler pulley 53, and the clutch mechanisms 91 and 92 associated with pulleys 21A and 24A, respectively.

Endless belt 213 passes into and out of the housing 90 through apertures on the opposite side of the housing. The shafts 93 and 94 on which spools 51 and 52 are carried are also supported by the housing 90, as illustrated.

What is claimed is:

1. A tape cartridge for transferring data between a length of tape and a disc drive head in a disc drive, said tape cartridge comprising:
   (a) a length of tape suitable for recording data thereon and for transferring data between the tape and said disc drive head; wherein said tape includes first and second ends;
   (b) a first rotatable reel on which said tape may be wound; said first end of said tape being secured to said first reel;
   (c) a second rotatable reel on which said tape may be wound; said second end of said tape being secured to said second reel;
   (d) registration means adapted to register a portion of said tape with a predetermined location at which data can be transferred between said tape and disc head;
   (e) feeding means adapted for feeding said tape past said predetermined location;
   (f) a first continuously acting clutch means operably connected to said first reel for driving said first reel; and
   (g) a second continuously acting clutch means operably connected to said second reel for driving said second reel; wherein said feeding means is selectively rotatable in opposite directions and is coupled to said first and second clutch means; and
   wherein when one said clutch means is driven in one direction it is adapted to rotate the reel to which it is connected such that said tape is wound onto said reel while the other said clutch is adapted to permit the reel to which it is connected to be rotated so as to unwind tape therefrom.

2. A tape cartridge in accordance with claim 1, wherein said registration means comprises: (a) alignment means for aligning said tape cartridge with said disc drive when said cartridge is loaded into said disc drive, and (b) guide means for guiding said tape within said cartridge such that, when the cartridge is aligned with said disc drive, said tape is registered with said predetermined location.

3. A tape cartridge as in claim 2 wherein the tape cartridge includes a Section A that is insertable into the disc drive, the Section A having a substantially planar region and containing a portion of said length of tape in said substantially planar region.

4. A tape cartridge as in claim 3 wherein, within Section A, the guide means comprises:
   (a) a plurality of twist tape guides;
   (b) said tape wrapping about each of said twist tape guides by substantially 180 degrees to change the direction of feed of the tape and to rotate the normal to the plane of the tape by substantially 180 degrees so that the tape feeds through Section A within a disc like region, whereby Section A can have a disc like shape suitable for insertion into a disc drive.

5. A tape cartridge in accordance with claim 1, further comprising:
   a protective shell enclosing the tape, said shell having a bottom portion that includes therein at least two holes located such that, when the tape cartridge is loaded into the disc drive, each of the holes fits over an associated peg in the disc drive and aligns the tape cartridge with the disc drive.

6. A tape cartridge as in claim 5, for use with a disc drive having a motor shaft, wherein one of said holes in the bottom portion of the shell is adapted to fit over the motor shaft, whereby the motor shaft functions as one of said disc drive pegs utilized to align the tape cartridge with said predetermined location.

7. A tape cartridge in accordance with claim 1, wherein said feeding means comprises means for driving one of said reels in a rotatable manner so as to wind tape onto one said reel while tape is being unwound from the other said reel.

8. A tape cartridge in accordance with claim 7, wherein said means for driving said reel comprises an endless flexible belt which is coupled to the disc drive motor.

9. A tape cartridge in accordance with claim 1, wherein each said clutch means comprises a ratchet wheel and a pawl, wherein said ratchet wheel is adapted to rotate in one direction without engaging said pawl, and wherein said ratchet wheel engages said pawl when said ratchet wheel is rotated in the opposite direction.

10. A tape cartridge in accordance with claim 1, wherein each said clutch means comprises first and second sections, wherein said first section includes a fibrous pad and said second section comprises a mesh layer, wherein said fibrous pad of said first section is adapted to engage said mesh layer of said second section when said first section is rotated in one direction, and wherein said fibrous pad is adapted to slip past said mesh layer when said first section is rotated in the opposite direction.

11. A tape cartridge in accordance with claim 1, wherein each said clutch means comprises (a) a rotatable shaft having a detent on its peripheral surface, and (b) a spring member having a finger on one end thereof; wherein said finger is adapted to slip relative to said shaft when said shaft is rotated in one direction, and wherein said finger is adapted to engage said detent when said shaft is rotated in the opposite direction.

12. A tape cartridge for transferring data between a length of tape and a disc drive head in a disc drive, said tape cartridge comprising:
(a) a length of tape suitable for recording data thereon and for transferring data between the tape and said disc drive head; wherein said tape includes first and second ends;
(b) a first rotatable reel on which said tape may be wound; said first end of said tape being secured to said first reel;
(c) a second rotatable reel on which said tape may be wound; said second end of said tape being secured to said second reel;
(d) registration means adapted to register a portion of said tape with a predetermined location at which data can be transferred between said tape and said disc head;
(e) feeding means adapted for feeding said tape past said predetermined location; said feeding means comprising an endless flexible reel adapted to be driven by the disc drive motor when said tape cartridge is inserted into said disc drive;
(f) a first continuously acting clutch means operable connected to said first reel for driving said first reel; and
(g) a second continuously acting clutch means operably connected to said second reel for driving said second reel; wherein said feeding means is selectively rotatable in opposite directions and is coupled to said first and second clutch means; and wherein when one said clutch means is driven in one direction it is adapted to rotate the reel to which it is connected such that said tape is wound onto said reel while the other said clutch is adapted to permit the reel to which it is connected to be rotated so as to unwind tape therefrom.

13. A tape cartridge in accordance with claim 12, wherein said registration means comprises: (a) alignment means for aligning said tape cartridge with said disc drive when said cartridge is loaded into said disc drive, and (b) guide means for guiding said tape within said cartridge such that, when the cartridge is aligned with said disc drive, said tape is registered with said predetermined location.

14. A tape cartridge as in claim 13, wherein the tape cartridge includes a Section A that is insertable into the disc drive, the Section A having a substantially planar region and containing a portion of said length of tape in said substantially planar region.

15. A tape cartridge as in claim 14 wherein, within Section A, the guide means comprises:
(a) a plurality of twist tape guides;
(b) said tape wrapping about each of said twist tape guides by substantially 180 degrees to change the direction of feed of the tape and to rotate the normal to the plane of the tape by substantially 180 degrees so that the tape feeds through Section A within a disc like region, whereby Section A can have a disc like shape suitable for insertion into a disc drive.

16. A tape cartridge in accordance with claim 12, further comprising a protective shell enclosing the tape, said shell having a bottom portion that includes therein at least two holes located such that, when the tape cartridge is loaded into the disc drive, each of the holes fits over an associated peg in the disc drive and aligns the tape cartridge with the disc drive.

17. A tape cartridge in accordance with claim 14, wherein said cartridge is adapted for use with a disc drive having a motor shaft, wherein one of said holes in the bottom portion of the shell is adapted to fit over the motor shaft, whereby the motor shaft functions as one of said disc drive pegs utilized to align the tape cartridge with said predetermined location.

18. A tape cartridge in accordance with claim 12, wherein said feeding means comprises means for driving one of said reels in a rotatable manner so as to wind tape onto one said reel while tape is being unwound from the other said reel.

19. A tape cartridge in accordance with claim 18, wherein said means for driving said reel comprises an endless flexible belt which is coupled to the disc drive motor.

20. A tape cartridge in accordance with claim 19, wherein said endless belt extends over first and second pulleys, wherein said first pulley is operably connected to said first reel by means of said first clutch means, and wherein said second pulley is operably connected to said second reel by means of said second clutch means.

21. A tape cartridge in accordance with claim 12, wherein each said clutch means comprises first and second sections, wherein said first section includes a fibrous pad and said second section comprises a mesh layer, wherein said fibrous pad of said first section is adapted to engage said mesh layer of said second section when said first section is rotated in one direction, and wherein said fibrous pad is adapted to slip past said mesh layer when said first section is rotated in the opposite direction.

22. A tape cartridge in accordance with claim 12, wherein each said clutch means comprises (a) a rotatable shaft having a detent on its peripheral surface, and (b) a spring member having a finger on one end thereof; wherein said finger is adapted to slip relative to said shaft when said shaft is rotated in one direction, and wherein said finger is adapted to engage said detent when said shaft is rotated in the opposite direction.

23. A tape cartridge in accordance with claim 12, wherein each said clutch means comprises a ratchet wheel and a pawl, wherein said ratchet wheel is adapted to rotate in one direction without engaging said pawl, and wherein said ratchet wheel engages said pawl when said ratchet wheel is rotated in the opposite direction.

24. A magnetic tape cartridge for transferring data between a length of tape and a disc drive head in a disc drive, said magnetic tape cartridge comprising:
 a length of tape having first and second ends and being cooperative with said disc drive head for transferring information between the disc drive head and the length of tape;
 a first rotatable reel onto which said length of tape may be wound, said first end of said length of tape being secured to said first rotatable reel;
 a second rotatable reel onto which said length of tape may be wound, said second end of said length of tape being secured to said second rotatable reel;
 registration means adapted to register a portion of said length of tape with a predetermined location at which data can be transferred between said length of tape and said disc drive head;
 first continuously acting clutch means operatively connected to said first rotatable reel for driving said first rotatable reel in one direction, said first clutch means allowing said first rotatable reel to rotate freely in the opposite direction;
 second continuously acting clutch means operatively connected to said second rotatable reel for driving said second rotatable reel to rotate freely in the opposite direction;
 reversible tape feeding means coupled to said first and second clutch means, said reversible tape feeding means being operative for driving said first clutch means such that said length of tape moves in a forward direction while said length of tape is wound onto said first rotatable reel, said reversible tape feeding means being further operative for driving said second clutch means such that said length of tape moves in a reverse direction while said length of tape is wound onto said second rotatable reel.

25. A magnetic tape cartridge in accordance with claim 24, wherein said registration means comprises:
 alignment means for aligning said magnetic tape cartridge with said disc drive when said magnetic tape cartridge is inserted into said disc drive; and
 guide means for guiding said length of tape within said magnetic tape cartridge such that said length of tape is registered with said predetermine location when said magnetic tape cartridge is aligned with said disc drive.

26. A magnetic tape cartridge as in claim 25 wherein said magnetic tape cartridge includes a Section A that is insertable into the disc drive, the Section A having a substantially planar region and containing a portion o said length of tape in said substantially planar region.

27. A magnetic tape cartridge as in claim 26 wherein, within Section A, the guide means comprises:
 a plurality of twist tape guides, said length of tape wrapping about each of said plurality of twist tape guides by substantially 180 degrees to change the direction of feed of the length of tape and to rotate the normal to the plane of the length of tape by substantially 180 degrees so that the length of tape feeds through Section A within a disc-like region, whereby Section A has a disc-like shape suitable for insertion into said disc drive.

28. A magnetic tape cartridge in accordance with claim 24, further comprising a protective shell enclosing said length of tape, said protective shell having a bottom portion that includes therein at least two holes located such that, when the magnetic tape cartridge is inserted into the drive, each of the holes fits over an associated one of two pegs in the disc drive for aligning the magnetic cartridge with the disc drive.

29. A magnetic tape cartridge as in claim 28, for use with a disc drive having a motor shaft, wherein one of said holes in the bottom portion of said protective shell is adapted to fit over the motor shaft, whereby the motor shaft functions as one of said two pegs utilized to align the magnetic tape cartridge with said predetermined location.

30. A magnetic tape cartridge in accordance with claim 24, wherein said reversible tape feeding means comprises means for driving one of said first and second rotatable reels so as to wind said length of tape onto said one of said first and second rotatable reels while said length of tape is being unwound from the other of said first and second rotatable reels.

31. A magnetic tape cartridge in accordance with claim 30, wherein said means for driving comprises an endless flexible belt coupled to a disc drive motor.

32. A magnetic tape cartridge in accordance with claim 24, wherein each of said first and second clutch means comprises a ratchet wheel and a pawl, wherein said ratchet wheel is adapted to rotate in one direction without engaging said pawl, and wherein said ratchet wheel engages said pawl when said ratchet wheel is rotated in the opposite direction.

33. A magnetic tape cartridge in accordance with claim 24, wherein each of said first and second clutch means comprises first and second sections, wherein said first section includes a fibrous pad and said second section comprises a mesh layer, wherein said fibrous pad of said first section is adapted to engage said mesh layer of said second section when said first section is rotated in one direction, and wherein said fibrous pad is adapted to slip past said mesh layer when said first section is rotated in the opposite direction.

34. A magnetic tape cartridge in accordance with claim 24, wherein:
 each of said first and second clutch means comprises a rotatable shaft having a detent on its peripheral surface and a spring member having a finger on one end thereof;
 said finger is adapted to slip relative to said rotatable shaft when said rotatable shaft is rotated in one direction; and said finger is adapted to engage said detent when said rotatable shaft is rotated in the opposite direction.

35. A magnetic tape cartridge for transferring data between a length of tape and a disc drive head in a disc drive, said magnetic tape cartridge comprising:
- a length of tape having first and second ends and being cooperative with said disc drive head for transferring information between the disc drive head and the length of tape;
- a first rotatable reel onto which said length of tape may be wound, said first end of said length of tape being secured to said first rotatable reel;
- a second rotatable reel onto which said length of tape may be wound, said second end of said length of tape being secured to said second rotatable reel;
- registration means adapted to register a portion of said length of tape with a predetermined location at which data can be transferred between said length of tape and said disc drive head;
- first continuously acting clutch means operatively connected to said first rotatable reel for driving said first rotatable reel in one direction, said first clutch means allowing said first rotatable reel to rotate freely in the opposite direction;
- second continuously acting clutch means operatively connected to said second rotatable reel for driving said second rotatable reel in one direction, said second clutch means allowing said second rotatable reel to rotate freely in the opposite direction;
- reversible tape feeding means selectively rotatable in opposite directions and coupled to said first and second clutch means, said reversible tape feeding means being operative for driving said first clutch means such that said length of tape moves in a forward direction while said length of tape is wound onto said first rotatable reel, said reversible tape feeding means being further operative for driving said second clutch means such that said length of tape moves in a reverse direction while said length of tape is wound onto said second rotatable reel, and said reversible tape feeding means comprising an endless flexible belt adapted to be driven by a disc drive motor when said magnetic tape cartridge is inserted said disc drive.

36. A magnetic tape cartridge in accordance with claim 35, wherein said registration means comprises:
- alignment means for aligning said magnetic tape cartridge with said disc drive when said magnetic tape cartridge is inserted into said disc and
- guide means for guiding said length of tape within said magnetic tape cartridge such that said length of tape is registered with said predetermined location when said magnetic tape cartridge is aligned with said disc drive.

37. A magnetic tape cartridge as in claim 36 wherein said magnetic tape cartridge includes a Section A that is insertable into the disc drive, the Section A having a substantially planar region and containing a portion of said length of tape in said substantially planar region.

38. A magnetic tape cartridge as in claim 37 wherein, within Section A, the guide means comprises:
- a plurality of twist tape guides, said length of tape wrapping about each of said plurality of twist tape guides by substantially 180 degrees to change the direction of feed of the length of tape and to rotate the normal to the plane of the length of tape by substantially 180 degrees so that the length of tape feeds through Section A within a disc-like region, whereby Section A has a disc-like shape suitable for insertion into said disc drive.

39. A magnetic tape cartridge in accordance with claim 35, further comprising a protective shell enclosing said length of tape, said protective shell having a bottom portion that includes therein at least two holes locate such that, when the magnetic tape cartridge is inserted into the disc drive, each of the holes fits over an associated one of at least two pegs in the disc drive for aligning the magnetic tape cartridge with the disc drive.

40. A magnetic tape cartridge as in claim 39, for use with a disc drive having a motor shaft, wherein one of said holes in the bottom portion of said protective shell is adapted to fit over the motor shaft, whereby the motor shaft functions as one of said pegs utilized to align the magnetic tape cartridge with said predetermined location.

41. A magnetic tape cartridge in accordance with claim 35, wherein said reversible tape feeding means comprises means for driving one of said first and second rotatable reels so as to wind said length of tape onto said one of said first and second rotatable reels while said length of tape is being unwound from the other of said first and second rotatable reels.

42. A magnetic tape cartridge in accordance with claim 35, wherein each of said first and second clutch means comprises a ratchet wheel and a pawl, wherein said ratchet wheel is adapted to rotate in one direction without engaging said pawl, and wherein said ratchet wheel engages said pawl when said ratchet wheel is rotated in the opposite direction.

43. A magnetic tape cartridge in accordance with claim 35, wherein each of said first and second clutch means comprises first and second sections, wherein said first section includes a fibrous pad and said second section comprises a mesh layer, wherein said fibrous pad of said first section is adapted to engage said mesh layer of said second section when said first section is rotated in one direction, and wherein said fibrous pad is adapted to slip past said mesh layer when said first section is rotated in the opposite direction.

44. A magnetic tape cartridge in accordance with claim 35, wherein:
- each of said first and second clutch means comprises a rotatable shaft having a detent on its peripheral surface and a spring member having a finger on one end thereof;
- said finger is adapted to slip relative to said rotatable shaft when said rotatable shaft is rotated in one direction; and
- said finger is adapted to engage said detent when said rotatable shaft is rotated in the opposite direction.

45. A magnetic tape cartridge in accordance with claim 35, wherein said endless flexible belt extends over first and second pulleys, wherein sai first pulley is operatively connected to said first rotatable reel by way of said first clutch means, and wherein said second pulley is operatively connected to said second rotatable reel by way of said second clutch means.

* * * * *